United States Patent
Matzger et al.

(10) Patent No.: US 8,425,659 B2
(45) Date of Patent: Apr. 23, 2013

(54) MICROPOROUS COORDINATION POLYMERS AS NOVEL SORBENTS FOR GAS SEPARATION

(75) Inventors: Adam J. Matzger, Ann Arbor, MI (US); Antek G. Wong-Foy, Ann Arbor, MI (US); Stephen Caskey, Franklin, WI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 393 days.

(21) Appl. No.: 12/744,709

(22) PCT Filed: Dec. 3, 2008

(86) PCT No.: PCT/US2008/085427
§ 371 (c)(1),
(2), (4) Date: May 26, 2010

(87) PCT Pub. No.: WO2009/073739
PCT Pub. Date: Jun. 11, 2009

(65) Prior Publication Data
US 2010/0258004 A1   Oct. 14, 2010

Related U.S. Application Data

(60) Provisional application No. 60/991,950, filed on Dec. 3, 2007.

(51) Int. Cl.
*B01D 59/26* (2006.01)
(52) U.S. Cl.
USPC .................................. 95/96; 95/139; 95/143

(58) Field of Classification Search ........ 95/96; 96/139, 96/143
See application file for complete search history.

(56) References Cited

U.S. PATENT DOCUMENTS

| | | | |
|---|---|---|---|
| 5,378,440 A | 1/1995 | Herbst et al. | |
| 6,989,044 B2 | 1/2006 | Zhang et al. | |
| 7,196,210 B2 | 3/2007 | Yaghi et al. | |
| 8,163,949 B2 * | 4/2012 | Mueller et al. | 556/115 |

OTHER PUBLICATIONS

International Search Report from corresponding International Application No. PCT/US2008/085427 (dated May 21, 2009).
International Preliminary Report on Patentability and Written Opinion of the International Searching Authority in counterpart International Application No. PCT/US2008/085427, dated Jun. 8, 2010 (5 pgs.).
Dietzel et al., "An In Situ High-Temperature Single-Crystal Investigation of a Dehydrated Metal-Organic Framework Compound and Field-Induced Magnetization of One-Dimensional Metal-Oxygen Chains," *Angew. Chem. Int. Ed.*, 117:6512-16 (2005).
Rosi et al., "Rod Packings and Metal-Organic Frameworks Constructed from Rod-Shaped Secondary Building Units," *J. Am. Chem. Soc.*, 127:1504-18 (2005).

(Continued)

*Primary Examiner* — Robert A Hopkins
(74) *Attorney, Agent, or Firm* — Harness, Dickey & Pierce, P.L.C.

(57) ABSTRACT

A method of separating a target component from a chemical mixture comprising contacting a chemical mixture with a microporous coordination polymer. The microporous polymer is described by the formula:

$$[M_2(C_8H_2O_6)]$$

where M is a transition metal, rare earth metal, or other element from the groups consisting of IIA through VB.

24 Claims, 20 Drawing Sheets

OTHER PUBLICATIONS

Dietzel et al., "Hydrogen Adsorption in a Nickel Based Coordination Polymer with Open Metal Sites in the Cylindrical Cavities of the Desolvated Framework," *Chem. Commun.*, 959-61 (2006).

Dietzel et al., "Base-Induced Formation of Two Magnesium Metal-Organic Framework Compounds with a Bifunctional Tetratopic Ligand," *Eur. J. Inorg. Chem.*, 3624-32 (2008).

Zhou et al., "Enhanced $H_2$ Adsorption in Isostructural Metal-Orgainic Frameworks with Open Metal Sites: Strong Dependence of the Binding Strength on Metal Ions," *J. Am. Chem. Soc.*, 130:15268-69 (2008).

Glover et al., "MOF-74 Building Unit has a Direct Impact on Toxic Gas Adsorption," *Chem. Eng. Sci.*, 66:163-70 (2011).

\* cited by examiner

MICROPOROUS COORDINATION POLYMERS AS NOVEL SORBENTS FOR GAS SEPARATION

CROSS-REFERENCE TO RELATED APPLICATIONS

This application claims the benefit of U.S. provisional application Ser. No. 60/991,950 filed Dec. 3, 2007.

BACKGROUND OF INVENTION

1. Field of the Invention

The present invention relates to metal-organic microporous coordination polymers and their use in chemical separation of gases.

2. Background Art

The development of materials with high adsorption of carbon dioxide at low relative pressure and ambient temperature has been a significant challenge to materials chemistry. Physical adsorption of carbon dioxide is an emergent technology. This system may replace the currently used processes, such as chemical adsorption by a bed of amine, which are costly to operate. Microporous coordination polymers (MCPs) offer advantages as high surface area materials yet the challenge that is addressed here is the development of an MCP with a strong affinity for $CO_2$. Such a material provides high adsorption at low relative pressures and ambient temperature. Amines are presently materials of choice for sequestration of $CO_2$. Flue gas, for example from coal combustion, is bubbled through a solution of amine that reacts with the $CO_2$. The product of this reaction can then be pumped to another vessel and heated to release the $CO_2$ and recycle the amine. The process however is inefficient and costly in terms of energy required to recycle the amine. Physisorption, as opposed to this chemisorption, is likely to be a more efficient and less expensive method of sequestration of $CO_2$ if high affinity $CO_2$ materials are developed. In general, physisorption provides ready release of the sorbed gas with moderate changes in pressure or temperature unlike chemisorption which generally requires more vigorous conditions.

In light of this, adsorbent materials or molecular sieves such as zeolites have been investigated extensively for $CO_2$ uptake. Zeolite syntheses often require high temperature conditions for both syntheses and calcinations. In most cases, the nature of zeolites does not provide the opportunity for synthetic flexibility and/or ready functionalization. Yet to this point zeolites have been among the best materials for $CO_2$ uptake. Zeolite 13X (UOP) has been the traditionally used sorbent for $CO_2$ storage and has been reported to provide uptake of 4.7 mmol $CO_2$/g sorbent (20.7 wt %) at 1 bar and 298 K.

A new class of materials known as MCPs offer many advantages to zeolites in the ease of synthesis, flexibility in functionalization and alteration, and characterization due to crystallinity. MCPs are composed of multifunctional organic linkers and metal-containing secondary building units (SBUs). Synthetic procedures are easily altered by modification of the linker such that functional groups can be added to the framework or the framework can be expanded. Substitution of the metal in the synthesis of MCPs has generally led to different SBUs which in turn leads to global changes to the resulting structure and porosity. Thus, careful examination of the metal effects alone has not been possible due to differences in structure of the resulting networks. There is a need to examine the effects of only the metal on the resulting properties of the MCP. Here isostructural MCPs have been synthesized and the effect on $CO_2$ uptake is investigated leading to a very high affinity $CO_2$ material.

Currently known MCPs have relatively unexceptional uptake of $CO_2$ at low relative pressure. The best performance achieved previously by a material in this class is 21.4 wt % at 1.1 bar and 298 K by MOF-74. This material is difficult to synthesize and activate to high surface area. Also, the activation/evacuation conditions required to achieve porosity are relatively harsh (vacuum, 270° C., 16 hours). HKUST-1 [$Cu_3$(BTC)$_2$, BTC=benzene-1,3,5-tri-carboxylate or trimesylate] is another MCP with relatively strong affinity for $CO_2$. The adsorption of $CO_2$ on HKUST-1 was first reported in 2002 to achieve ~4.2 mol $CO_2$/kg MCP or ~18 wt % at ~1 bar and 295 K. This was substantiated in 2005 by a report of 17.9 wt % at 1 bar and 298 K. The most recent report of a relatively strong affinity $CO_2$ material was in 2007 using $Fe_4O_2(BTB)_{8/3}$, which displayed ~95 mL $CO_2$/g or ~19 wt % at 273 K and ~48 mL $CO_2$/g or ~9.4 wt % at 298 K. Thus, currently known MCPs are comparable to 13× zeolite in low pressure $CO_2$ uptake at room temperature and there remains a great need for higher affinity $CO_2$ uptake materials and especially those that function well below one bar.

The separations of close boiling mixtures of ethane/ethylene or propane/propylene are among the most energy-intensive separations carried out in the chemical and petrochemical industry. Because of the relatively close boiling points within the two pairs of compounds, cryogenic distillation at super pressures in trayed fractionators is still used to separate them on a large scale. Other approaches that are potentially less energy intensive involve an absorption/stripping method based on aqueous silver nitrate solutions and adsorption on a solid sorbent. Zeolites or molecular sieves and π-complexation sorbents are types of sorbents have been examined to accomplish these separations. Among the former materials that have been studied are activated carbon, 4A zeolite, 13× molecular sieve and the aluminophosphate AlPO$_4$-14 molecular sieve. π-Complexation sorbents are normally based on silica gel and activated alumina that are impregnated with transition metal salts such as $AgNO_3$ or CuCl. Other materials that have been examined for light olefin/paraffin separations are metal-containing facilitated transport membranes.

SUMMARY OF THE INVENTION

The present invention solves one or more of the issues related to the separation of gases not addressed in the prior art. In an embodiment of the present invention, exceptionally high affinity $CO_2$ materials are provided. These materials include microporous coordination polymers containing Co, Ni, Mg, and/or Zn and an organic linker. The materials disclosed here, referred to as Co-74, Ni-74, and Mg-74, are particularly high affinity $CO_2$ materials with exceptional uptake of $CO_2$ at low relative pressures and ambient temperatures.

In another embodiment, a method of separating olefin/paraffin using a high affinity olefin-adsorbing material is provided. Such affinity olefin-adsorbing materials include microporous coordination polymers containing Co, Ni, Mg, and/or Zn and an organic linker. These material show good selectivities for olefin compounds over paraffin compounds. Co-74, Ni-74, and Mg-74 are useful in the chemical separation of unsaturated molecules from saturated molecules, and in particular olefins from paraffins. Ethylene and ethane can be separated using Co-74, Ni-74, Mg-74, and/or Zn-74. Propylene and propane can be separated using Co-74, Ni-74, Mg-74, and/or Zn-74.

DETAILED DESCRIPTION OF THE PREFERRED EMBODIMENT(S)

Figure 1:
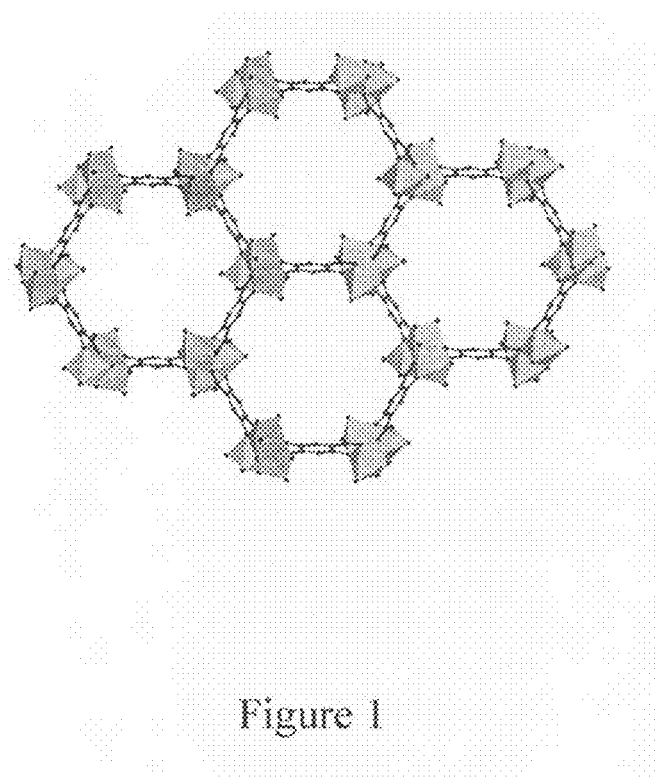
FIG. 1 provides the X-ray crystal structure for Co-74.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. The description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains.

As used herein "linking ligand" means a chemical species (including neutral molecules and ions) that coordinate two or more metal atoms or metal clusters resulting in an increase in their separation, and the definition of void regions or channels in the framework that is produced. Examples include, but are not limited to, 4,4'-bipyridine (a neutral, multiple N-donor molecule) and benzene-1,4-dicarboxylate (a polycarboxylate anion). In an embodiment of the present invention, a method of separating a target component from a chemical mixture is provided. The method of this embodiment comprises contacting a chemical mixture with a microporous polymer to form a modified chemical composition and to separate out a target component. Specifically, at least a portion of the target component is adsorbed to the microporous coordination polymer. In an optional subsequent step, the modified chemical composition is collected. The microporous polymer comprising monomer units having formula:

wherein M is a transition metal, rare earth metal, or other element from the groups consisting of IIA through VB. It should be appreciated that M is typically a metal ion (cation) while ($C_8H_2O_6$) is anionic. Specific examples of metal ions used include one or more ions selected from the group consisting $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{5+}$, $V^{4+}$, $V^{3+}$, $V^{2+}$, $Nb^{5+}$, $Nb^{3+}$, $Ta^{5+}$, $Ta^{3+}$, $Cr^{6+}$, $Cr^{3+}$, $Mo^{6+}$, $Mo^{3+}$, $W^{6+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{3+}$, $Rh^{2+}$, $Rh^{+}$, $Ir^{3+}$, $Ir^{+}$, $Ni^{3+}$, $Ni^{2+}$, $Pd^{4+}$, $Pd^{2+}$, $Pt^{4+}$, $Pt^{2+}$, $Cu^{2+}$, $Cu^{+}$, $Ag^{+}$, $Au^{3+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$, $Bi^{+}$, and combinations thereof. In a particularly useful variation, M is Co, Ni, Mg, or Zn. Particularly useful materials for the separation of gases are the materials named Co-74, Ni-74, Mg-74, and Zn-74 and are described below in more detail. In a variation, the structure of ($C_8H_2O_6$) is given by the following formula:

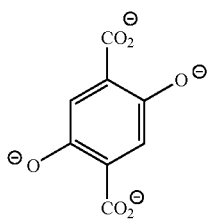

In a variation, a portion of the metal M is substituted with a different metal. In this variation, this different metal can be Co, Ni, Mg, or Zn, or any other metal compatible with the lattice of the microporous coordination polymers.

In another variation of the present embodiment, the microporous coordination polymers comprising monomer units having formula:

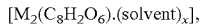

wherein M is a metal as set forth above and x is a real number. In a refinement, x is from 1 to 6.

The microporous coordination polymers may further include one or more non-linking ligands. Useful non-linking ligands include, for example, a ligand selected from the group consisting of $O^{2-}$, sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, sulfide, hydrogen sulphate, selenide, selenate, hydrogen selenate, telluride, tellurate, hydrogen tellurate, nitride, phosphide, arsenide, arsenate, hydrogen arsenate, dihydrogen arsenate, antimonide, antimonate, hydrogen antimonate, dihydrogen antimonate, fluoride, boride, borate, hydrogen borate, perchlorate, chlorite, hypochlorite, perbromate, bromite, hypobromite, periodate, iodite, hypoiodite; and mixtures thereof.

In a variation of the present embodiment, the chemical mixture used in the separation includes a plurality of components. An example of such a chemical mixture is air. Advantageously, the contact with the microporous polymer results in preferential removal of one component of the mixture. In a refinement of the present embodiment, the temperature at which the chemical mixture is contacted is from about 233 K to about 473 K.

In a variation of the present embodiment, the target component is an inorganic or organic molecule having a predetermined degree of unsaturation. Alternatively, the target component may be separated based on shape or size. In one refinement, the target component is $CO_2$ and the microporous material has a high affinity for $CO_2$. Examples of such materials include Co-74, Ni-74, and Mg-74.7. In a refinement of this variation, $CO_2$ uptake at 1 bar and 296 K is from about 20 to about 45 wt % (i.e., weight increase of the microporous material). In another refinement, the uptake of $CO_2$ at 0.1 bar and 296 K 1 is from about 5 to about 30 wt %.

In another variation, the microporous materials have a high affinity for ethylene. Examples of such materials include Co-74, Ni-74, Mg-74, and Zn-74. The adsorption selectivity for ethylene over ethane is important for the separation of these gases.

In another variation of the present invention, materials with the ability to separate olefins and paraffins are provided by use of microporous coordination polymers. The materials that are useful in the separation of gases are specifically named Co-74, Ni-74, Mg-74, and Zn-74. For example, the microporous coordination polymers adsorb olefins in preference to paraffins from about 0 to 50 bar and from about 200 K to 473 K while possessing reversible adsorption and desorption characteristics. Of particular importance are the separation of ethylene from ethane and the separation of propylene from propane.

In the embodiments and variations set forth above, the microporous coordination polymers are used as sorbents. In one refinement, the sorbents are used in fixed or moving bed adsorption systems for separation or sequestration of the target component. In another variation, the sorbents are used in pressure- or thermal-swing adsorption systems for separation or sequestration of the target component.

Co-74 is conveniently formed by a hydrothermal reaction of $Co(NO_3)_2 \cdot 6H_2O$ and 2,5-dihydroxyterephthalic acid. Preferred solvents for this reaction are mixtures of a formamide with an alcohol and water. The most preferred solvent is a 1:1:1 (v/v/v) mixture of N,N-dimethylformamide:ethanol:water. The reaction temperature is from about 50 to about 200° C., preferably 100° C. Ni-74 is conveniently formed by hydrothermal reaction of $Ni(NO_3)_2 \cdot 6H_2O$ and 2,5-dihydroxyterephthalic acid. Examples of solvents for this reaction are mixtures of a formamide with an alcohol and water. A particularly useful solvent is a 1:1:1 (v/v/v) mixture of N,N-dimethylformamide:ethanol:water. The reaction temperature is from about 50 to about 200° C. A reaction temperature of about 100° C. is particularly useful. Mg-74 is conveniently formed by hydrothermal reaction of $Mg(NO_3)_2 \cdot 6H_2O$ and 2,5-dihydroxyterephthalic acid. Examples of solvents for this reaction are mixtures of a formamide with an alcohol and water. A particularly useful solvent is a 15:1:1 (v/v/v) mixture of N,N-dimethylformamide:ethanol:water. The reaction temperature is from about 50 to about 200° C. A reaction temperature of about 125° C. is particularly useful. The structure of 2,5-dihydroxyterephthalic acid is presented in Formula I:

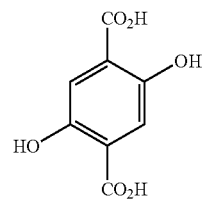

I

In a variation of the present invention, the microporous coordination polymer is activated by immersion in a low boiling solvent (e.g., methanol) followed by evacuation under vacuum at a temperature from 0° C. to about 325° C. A temperature of about 250° C. is particularly useful. In another variation, the microporous coordination polymer is activated by immersion in a low boiling solvent (e.g., methanol) followed by passing an inert gas such as nitrogen, carbon dioxide, helium, neon, argon, krypton, or xenon through the sorbent material while heating for about 12 hours. Particularly useful gases include nitrogen or helium. Typically, this activation is carried out at an elevated temperature from about 100 to 350° C. A particularly useful temperature is 250° C.

The composition of Co-74 is described as a combination of $Co^{2+}$ ions and the tetraanion of 2,5-dihydroxyterephthalic acid. The composition of Ni-74 is described as a combination of $Ni^{2+}$ ions and the tetraanion of 2,5-dihydroxyterephthalic acid. The composition of Mg-74 is described as a combination of $Mg^{2+}$ ions and the tetraanion of 2,5-dihydroxyterephthalic acid. The tetraanion of 2,5-dihydroxyterephthalic acid (i.e, an example of $(C_8H_2O_6)$) is described by Formula II:

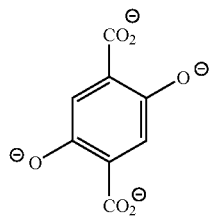

II

A variation of a method of preparing Co-74 for use as a sorbent is to first immerse the product crystals in methanol. The methanol is decanted and replaced four times over two days. Co-74 is then dried and evacuated under vacuum at elevated temperature (e.g. about 250° C.), for 5 hours. Samples of Co-74 are then handled and stored under vacuum or an inert atmosphere (e.g., $N_2$), but can be handled for brief periods under air, for example less than 1 minute. Other methods of preparing the Co-74 may include different solvents, numbers of washes, or thermal treatments.

A variation of a method of preparing Ni-74 for use as a sorbent is to first immerse the product crystals in methanol. The methanol is decanted and replaced four times over two days. Ni-74 is then dried and evacuated under vacuum at elevated temperature (e.g., about 250° C.) for 5 hours. Samples of Ni-74 are then handled and stored under vacuum or an inert atmosphere (e.g., $N_2$), but can be handled for brief periods under air, for example less than 1 minute. Other methods of preparing the Ni-74 may include different solvents, numbers of washes, or thermal treatments.

A variation of a method of preparing Mg-74 for use as a sorbent is to first immerse the product crystals in methanol. The methanol is decanted and replaced four times over two days. Mg-74 is then dried and evacuated under vacuum at elevated temperature (e.g., about 250° C.) for 5 hours. Samples of Mg-74 are then handled and stored under vacuum or an inert atmosphere (e.g., $N_2$) but can be handled for brief periods under air, for example less than 1 minute. Other methods of preparing the Mg-74 may include different solvents, numbers of washes, or thermal treatments.

The structural diagram for Co-74 is presented in FIG. 1. This structure is a three-dimensional framework with one-dimensional channels as depicted. The isostructural nature of Co-74, Ni-74, and Mg-74 is presented in FIGS. 2, 3, and 4 due to the approximate equivalence of the powder X-ray diffraction patterns.

These materials, Co-74, Ni-74, and Mg-74, display very strong affinity for $CO_2$. Carbon dioxide sorption isotherms are presented in FIGS. 5, 6, and 7 for Co-74, Ni-74, and Mg-74, respectively. High affinity for $CO_2$ at low partial pressures and ambient temperatures is preferable for certain applications. The uptake of $CO_2$ for Co-74 at 0.1 bar and 296 K is 11.74 wt %. It is understood that value obtained from an adsorption experiment should be used in an approximate fashion and that variations of 10% or more are typical and variation can arise from differences in sample history. The uptake of $CO_2$ for Ni-74 at 0.1 bar and 296 K is 11.57 wt %. The uptake of $CO_2$ for Mg-74 at 0.1 bar and 296 K is 23.58 wt %. The uptake of $CO_2$ for Co-74 at 1 bar and 296 K is 30.68 wt %. The uptake of $CO_2$ for Ni-74 at 1 bar and 296 K is 25.21 wt %. The uptake of $CO_2$ for Mg-74 at 1 bar and 296 K is 35.23 wt %.

These materials, Co-74, Ni-74, Mg-74, and Zn-74, display very strong affinity for ethylene. Ethylene sorption isotherms are presented in FIGS. 8, 9, and 10 for Co-74, Ni-74, and Zn-74, respectively. High affinity for ethylene at low partial pressures and ambient temperatures is preferable for certain applications. The uptake of ethylene for Co-74 at 0.1 bar and 298 K is 14.87 wt %. The uptake of ethylene for Ni-74 at 0.1 bar and 298 K is 11.02 wt %. The uptake of ethylene for Zn-74 at 0.1 bar and 298 K is 10.60 wt %. The uptake of ethylene for Co-74 at 1 bar and 298 K is 19.44 wt %. The uptake of ethylene for Ni-74 at 1 bar and 298 K is 22.36 wt %. The uptake of ethylene for Zn-74 at 1 bar and 298 K is 17.84 wt %. Hysteresis is observed in the ethylene sorption isotherm of Ni-74 indicating that ethylene is tightly bound in the pores.

These materials, Co-74, Ni-74, Mg-74, and Zn-74, display good affinity for ethane. Ethane sorption isotherms are presented in FIGS. 11, 12, and 13 for Co-74, Ni-74, and Zn-74, respectively. Good affinity for ethane at low partial pressures and ambient temperatures is preferable for certain applications. The uptake of ethane for Co-74 at 0.1 bar and 298 K is 6.58 wt %. The uptake of ethane for Ni-74 at 0.1 bar and 298 K is 5.11 wt %. The uptake of ethane for Zn-74 at 0.1 bar and 298 K is 4.38 wt %. The uptake of ethane for Co-74 at 1 bar and 298 K is 19.09 wt %. The uptake of ethane for Ni-74 at 1 bar and 298 K is 16.24 wt %. The uptake of ethane for Zn-74 at 1 bar and 298 K is 17.08 wt %.

These materials, Co-74, Ni-74, and Zn-74, display a high selectivity for ethylene over ethane.

Figure 14:
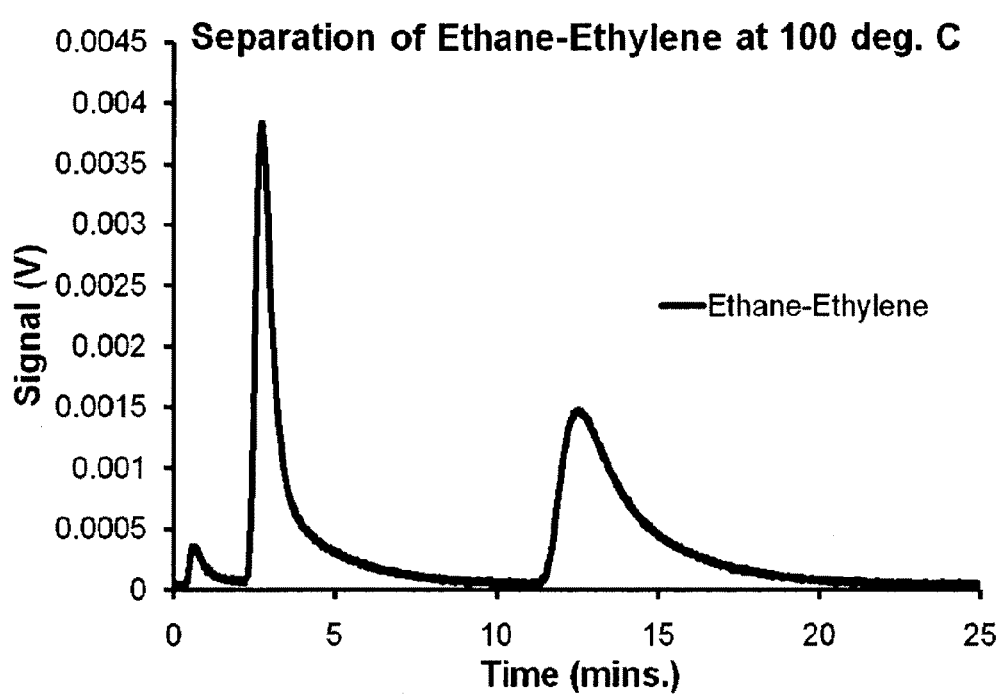
FIG. 14 provides an isothermal gas chromatogram of the separation of ethane and ethylene at 100° C. over a 50:50 wt. mixture of celite and Ni-74. Ethane elutes first at 2.7 minutes while ethylene elutes at 12.6 minutes.
Figure 15:
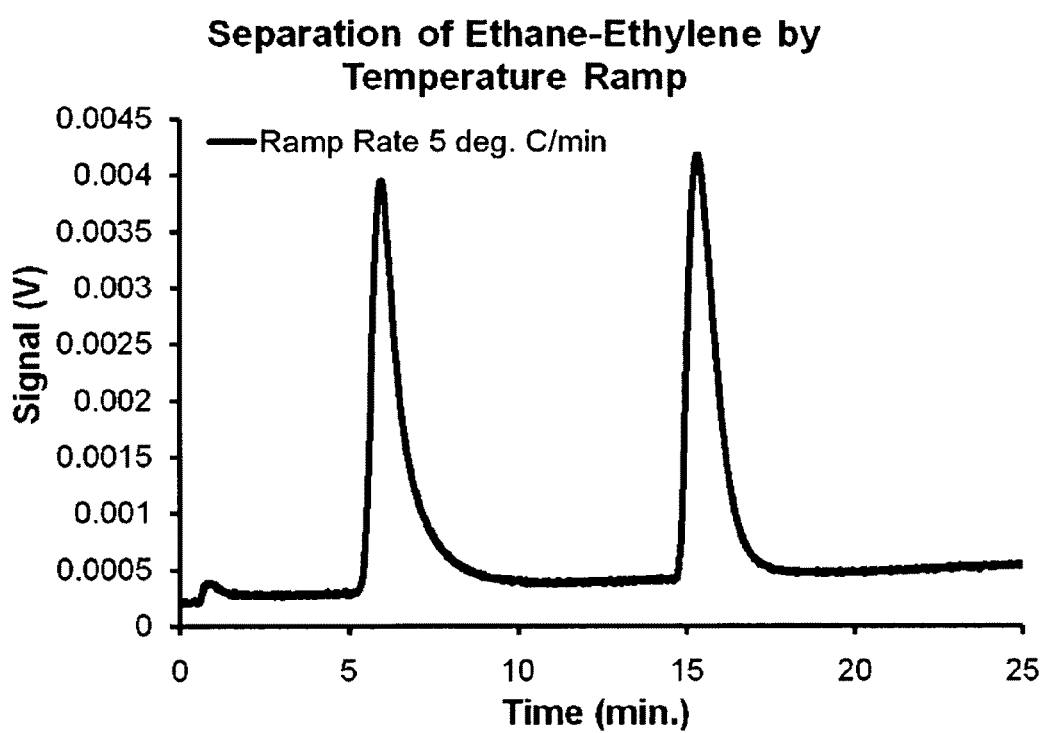
FIG. 15 provides a gas chromatogram of the separation of ethane and ethylene by a temperature ramp program from 50° C. to 175° C. at a rate of 5° C./min over a 50:50 wt. mixture of celite and Ni-74. Ethane elutes first at 5.9 minutes while ethylene elutes at 15.3 minutes.
Figure 16:
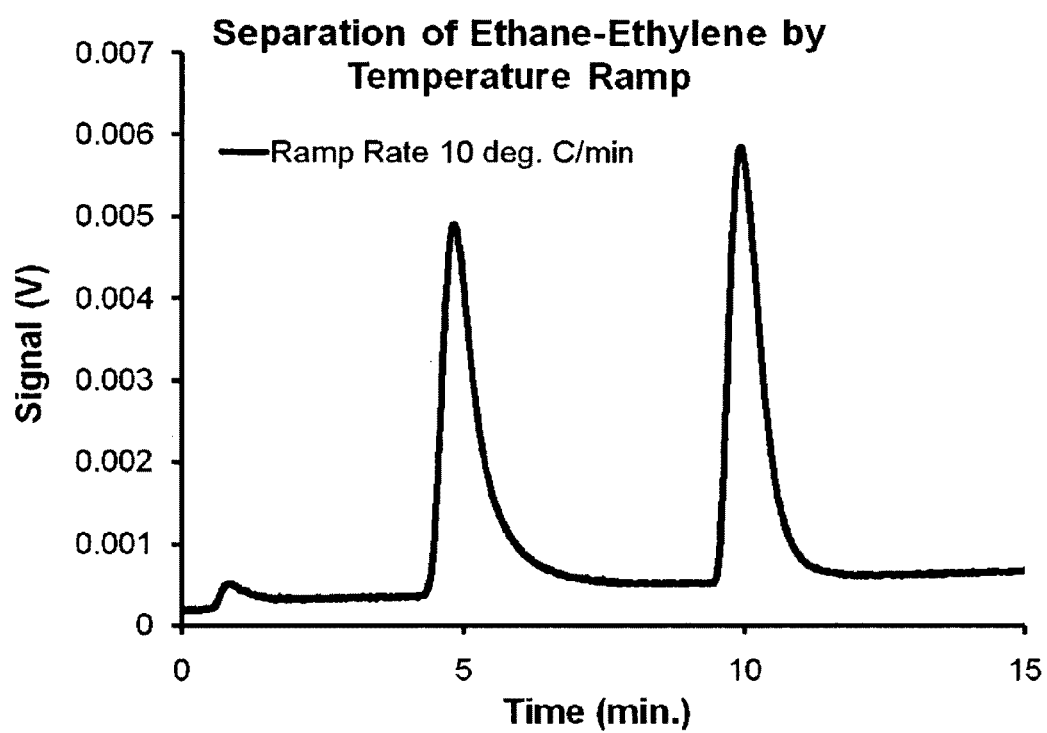
FIG. 16 provides a gas chromatogram of the separation of ethane and ethylene by a temperature ramp program from 50° C. to 200° C. at a rate of 10° C./min over a 50:50 wt. mixture of celite and Ni-74. Ethane elutes first at 4.8 minutes while ethylene elutes at 9.9 minutes.

Gas chromatographic separations of ethane and ethylene are presented in FIGS. 14, 15, and 16. Ethane and ethylene were separated by a 1 ft. GC column packed with the sorbent material, in this case a 50:50 by weight mixture of celite 545 (referred to as "celite" throughout) and Ni-74. In an isothermal separation displayed in FIG. 14, the separation column temperature for optimal separation is 100° C. The inlet pressure of the helium was 500 kPa. The retention time for ethane was 2.7 minutes while the retention time for ethylene was 12.6 minutes. In temperature ramp separations of ethane and ethylene as displayed in FIGS. 15 and 16, the initial column temperature was 50° C. and the programmed temperature ramp rate was 5° C./min and 10° C./min, respectively. The inlet pressure of the helium in each case was 360 kPa. At 5° C./min, the retention time for ethane was 5.9 minutes while the retention time for ethylene was 15.3 minutes. At 10° C./min, the retention time for ethane was 4.8 minutes while the retention time for ethylene was 9.9 minutes.

Gas chromatographic separations of propane and propylene are presented in FIGS. 17, 18, 19, and 20. Propane and propylene were separated by a 1 ft. GC column packed with the sorbent material, in this case a 50:50 by weight mixture of celite and Ni-74. In an isothermal separation displayed in FIG. 17, a useful separation column temperature for optimal separation is 100° C. The inlet pressure of the helium was 405 kPa. The retention time for propane was 14.9 minutes while the retention time for propylene was 93.9 minutes. In an isothermal separation displayed in FIG. 18, another column temperature for separation is 150° C. The inlet pressure of the helium was 500 kPa. The retention time for propane was 4.5 minutes while the retention time for propylene was 13.7 minutes. In temperature ramp separations of propane and propylene as displayed in FIGS. 19 and 20, a useful initial column temperature was 75° C. and the programmed temperature ramp rate was 5° C./min and 10° C./min, respectively. The inlet pressure of the helium in each case was 380 kPa. At 5° C./min, the retention time for propane was 12.2 minutes while the retention time for propylene was 20.25 minutes. At 10° C./min, the retention time for propane was 8.7 minutes while the retention time for propylene was 12.7 minutes.

These materials are applicable for use as adsorbents in continuous flow (flow-through) apparatuses or in pressure- or thermal-swing adsorption systems for separation or sequestration of gases.

An important variant of this invention is simple modification of the starting dicarboxylic acid linker utilized in the synthesis of Co-74, Mg-74, Ni-74, or Zn-74. Examples of simple modifications are described by Formulae III and IV:

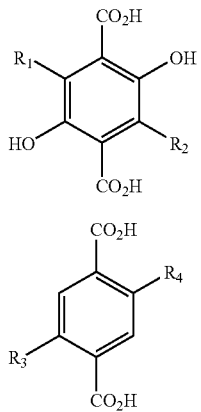

In Formula III, the substituents at 3- and 6-positions labeled $R_1$ and $R_2$ could be H, alkyl, aryl, halogen, OH, alkoxide, carboxylic acids, esters, sulfur-containing groups, silicon-containing groups, nitro, amino, cyano, boron-containing groups, or phosphorus-containing groups. In Formula IV, the hydroxides of 2,5-dihydroxyterephthalic acid are replaced by other metal coordinating groups at $R_3$ and $R_4$ such as thiol, primary or secondary amines, phosphorus-containing groups or boron-containing groups. There is also a variation in which substituents are placed at the 3- and/or 6-positions and one or both of the OHs are replaced by other metal coordinating groups.

In another variation, other metals are may be useful in place of $Co^{2+}$ and $Ni^{2+}$. Examples of useful metals are $Mg^{2+}$, $Ca^{2+}$, $Sr^{2+}$, $Ba^{2+}$, $Sc^{3+}$, $Ti^2$, $Ti^{4+}$, $V^{2+}$, $V^{3+}$, $Cr^{3+}$, $Mn^{2+}$, $Mn^{3+}$, $Fe^{2+}$, $Fe^{3+}$, $Co^{2+}$, $Ni^{2+}$, $Cu^{2+}$, and $Zn^{2+}$.

In another variation, other reaction solvents are useful in the synthesis of Co-74, Ni-74, and Mg-74. Other potential reaction solvents for formation of Co-74, Ni-74, and Mg-74 include N,N-dimethylformamide, N,N-diethylformamide, N,N-dimethylacetamide, 1-methyl-2-pyrrolidinone, tetrahydrofuran, water, alcohols, dimethylsulfoxide, toluene, benzene, chlorobenzene, or any combination thereof.

In another variation of the invention, the activation solvent, preferably methanol, may be replaced by another low boiling or low surface tension solvent, such as chloroform, methylene chloride, acetone, ether, hexanes, pentane, ethanol, or isopropanol.

In another variation of the invention, other temperatures are useful for the evacuation of Co-74, Ni-74, and Mg-74. The range of temperatures include from about 50° C. to about 350° C.

In another variation of the invention, other methods for preparation of the sorbent are useful in the evacuation of Co-74, Ni-74, Mg-74, and Zn-74. One method of evacuation is by passing an inert gas such as nitrogen, carbon dioxide, helium, neon, argon, krypton, or xenon through the sorbent material while heating for about 12 hours. Useful gases include nitrogen or helium. Typically, the sorbent material is heated to a temperature from about 100 to 350° C. A particularly useful temperature is about 250° C. This method is particularly useful in a column or bed packed with sorbent, which are both useful for separation processes.

The following non-limiting examples provide the composition and methods of the invention. Those skilled in the art will recognize variations of the present invention and scope of the claims.

I. Synthesis of Co-74

Figure 2:
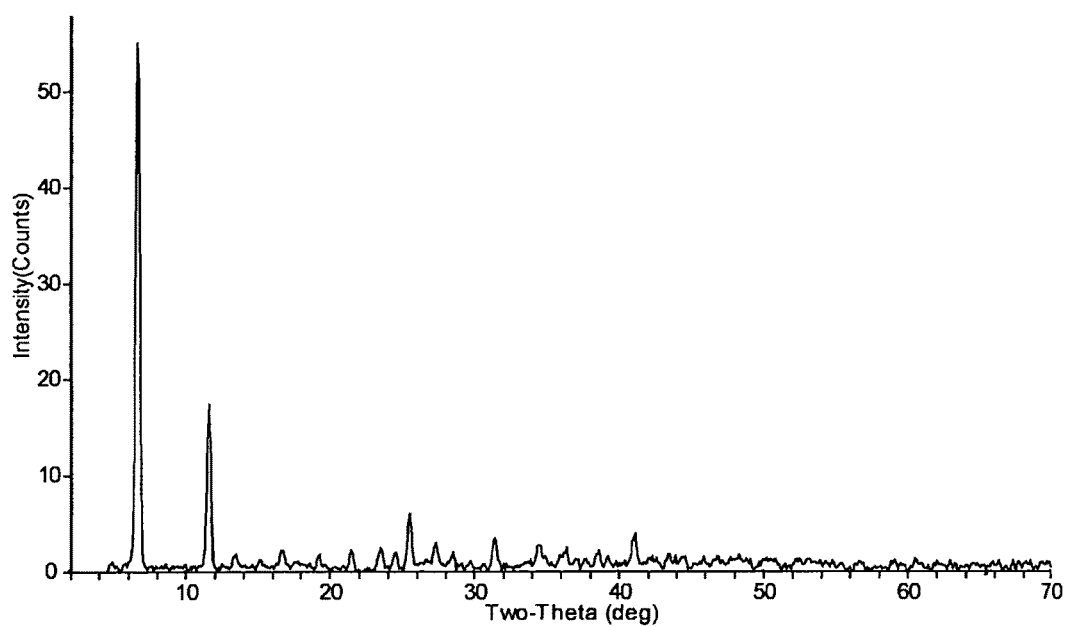
FIG. 2 provides a powder X-ray diffraction ("PXRD") pattern for Co-74.
Figure 3:
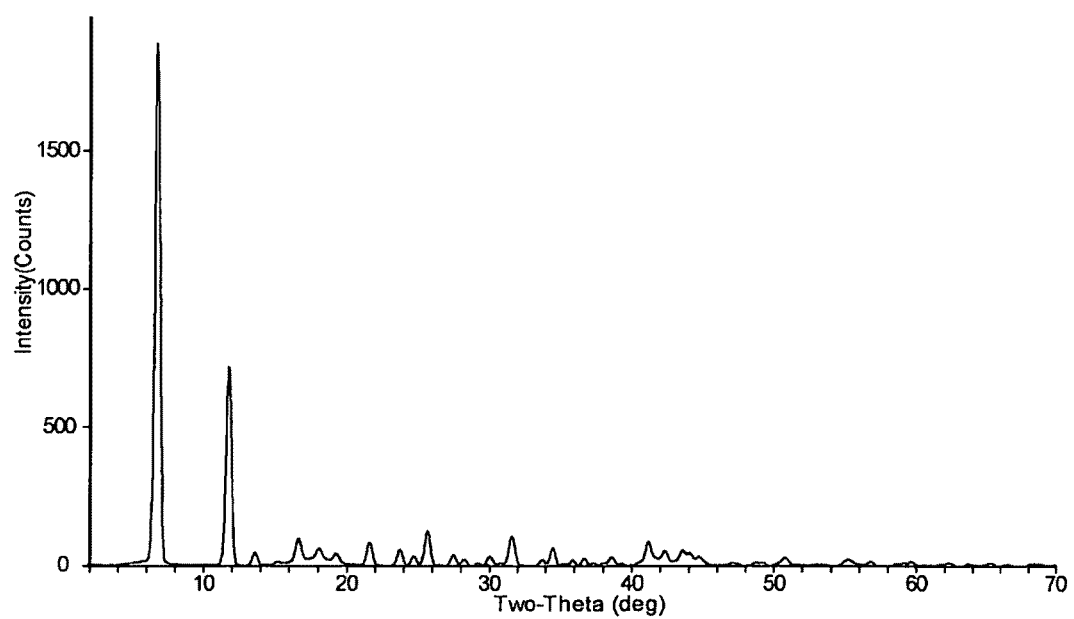
FIG. 3 provides a powder X-ray diffraction ("PXRD") pattern for Ni-74.
Figure 4:
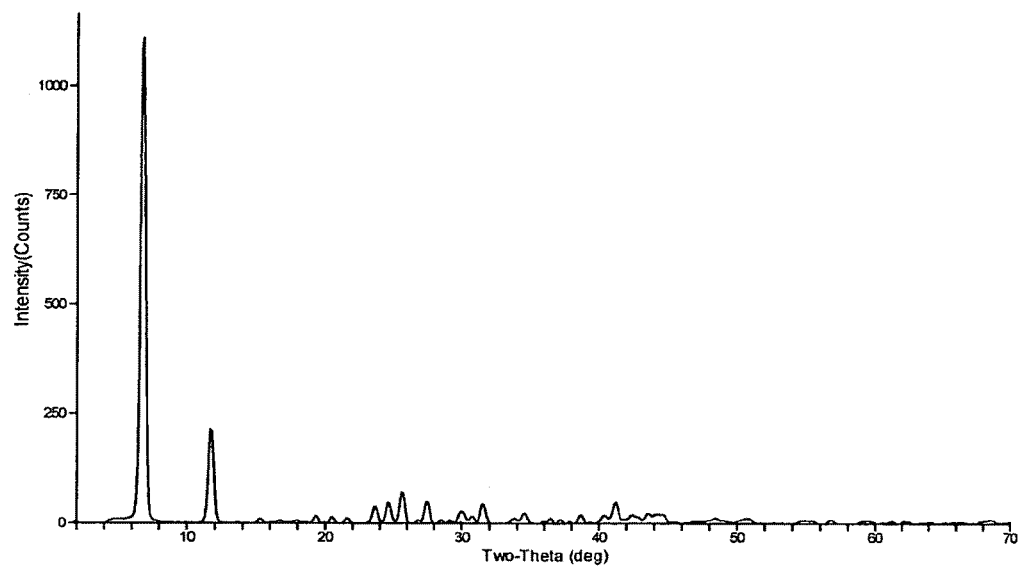
FIG. 4 provides a powder X-ray diffraction ("PXRD") pattern for Mg-74.

To a solid mixture of $H_2DHBDC$ (2,5-dihydroxyterephthalic acid, 0.482 g, 0.00243 mol, 1 equiv, Aldrich) and $Co(NO_3)_2 \cdot 6H_2O$ (2.377 g, 0.008167 mol, 3.36 equiv, ACROS) was added a 1:1:1 (v/v/v) mixture of DMF-ethanol-water (200 mL). The solution was mixed well and ultrasonicated until homogeneous. The reaction vial was capped tightly and placed in the oven at 100° C. After 24 hours, the sample was removed from the oven and allowed to cool to RT. The mother liquor was decanted from the red-orange trigonal crystals and replaced with methanol (200 mL). The methanol was decanted and replenished four times over two days. The solvent was removed under vacuum at 250° C. over 5 hours, yielding the dark red-purple crystalline, porous material. The activated material is stored under vacuum or under an inert atmosphere such as $N_2$. The crystallinity of the resulting product and the isostructural nature of Co-74, Ni-74, and Mg-74 are confirmed by the similarity of the powder X-ray diffraction pattern (FIG. 2, FIG. 3, and FIG. 4).

II. Synthesis of Ni-74

To a solid mixture of $H_2DHBDC$ (2,5-dihydroxyterephthalic acid, 0.478 g, 0.00241 mol, 1 equiv, Aldrich) and $Ni(NO_3)_2 \cdot 6H_2O$ (2.378 g, 0.008178 mol, 3.39 equiv, Aldrich) was added a 1:1:1 (v/v/v) mixture of DMF-ethanol-water (200 mL). The solution was mixed well and ultrasonicated until homogeneous. The reaction vial was capped tightly and placed in the oven at 100° C. After 24 hours, the sample was removed from the oven and allowed to cool to RT. The mother liquor was decanted from the yellow microcrystalline material and replaced with methanol (200 mL). The methanol was decanted and replenished four times over two days. The solvent was removed under vacuum at 250° C. over 5 hours, yielding the yellow-brown microcrystalline, porous material. The activated material is stored under vacuum or under an inert atmosphere such as $N_2$. The crystallinity of the resulting product and the isostructural nature of Co-74, Ni-74, and Mg-74 are confirmed by the similarity of the powder X-ray diffraction pattern (FIG. 2, FIG. 3, and FIG. 4).

III. Synthesis of Mg-74

To a solid mixture of $H_2DHBDC$ (2,5-dihydroxyterephthalic acid, 0.111 g, 0.000559 mol, 1 equiv, Aldrich) and Mg(NO$_3$)$_2$.6H$_2$O (0.475 g, 0.00185 mol, 3.31 equiv, Baker) was added a 15:1:1 (v/v/v) mixture of DMF-ethanol-water (50 mL). The solution was mixed well and ultrasonicated until homogeneous. The reaction solution was then dispensed to five 20-mL stint vials. The reaction vials were capped tightly with Teflon-lined caps and placed in the oven at 125° C. After 24 hours, the samples were removed from the oven and allowed to cool to RT. The mother liquor was decanted from the yellow microcrystalline material and replaced with methanol (10 mL per vial). The yellow microcrystalline material was combined into one vial. The methanol was decanted and replenished four times over two days. The solvent was removed under vacuum at 250° C. over 5 hours, yielding the dark yellow microcrystalline, porous material. The activated material is stored under vacuum or under an inert atmosphere such as N$_2$. The crystallinity of the resulting product and the isostructural nature of Co-74, Ni-74, and Mg-74 are confirmed by the similarity of powder X-ray diffraction pattern (FIG. 2, FIG. 3, and FIG. 4).

IV. Sorption Experiments

Figure 5:
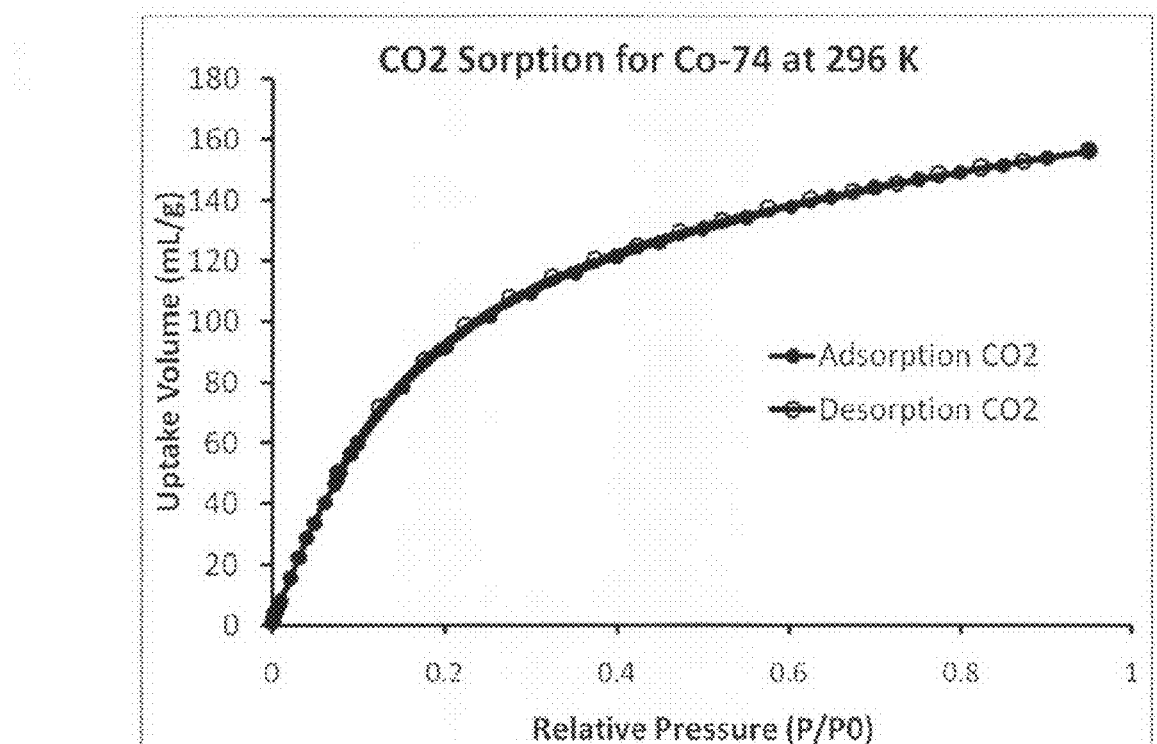
FIG. 5 provides a carbon dioxide sorption isotherm for Co-74 measured at 296 K.
Figure 6:
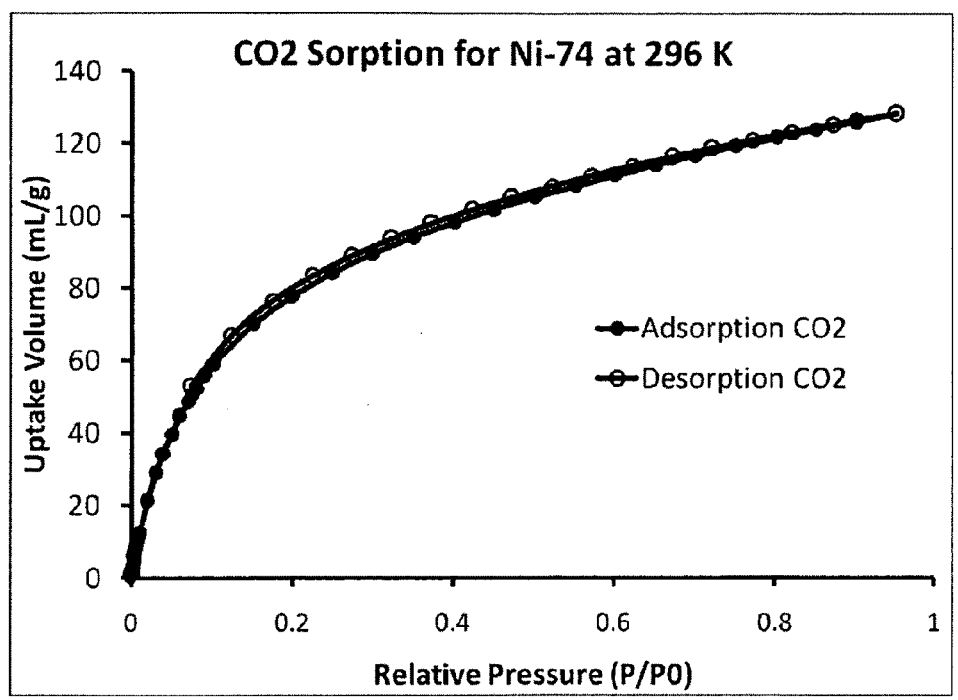
FIG. 6 provides a carbon dioxide sorption isotherm for Ni-74 measured at 296 K.
Figure 7:
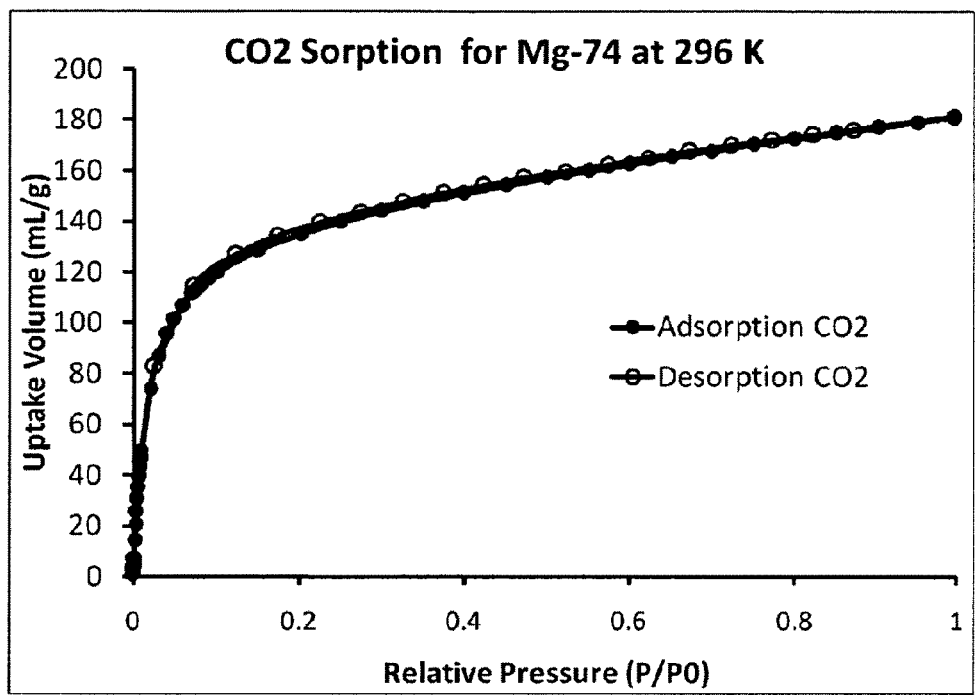
FIG. 7 provides a carbon dioxide sorption isotherm for Mg-74 measured at 296 K.

With reference to FIGS. 5, 6, and 7 gas sorption isotherms were measured volumetrically using a Quantachrome Autosorb-1 automated adsorption analyzer. A temperature-regulated water bath (296 K) is used for CO$_2$ isotherms. The CO$_2$ gas used is bone dry grade (99.9% purity). For all isotherm plots, closed circles are used for adsorption data and open circles are used for desorption data points. Data is collected in the range from $1.00 \times 10^{-4} \leq P/P_0 \leq 1.00$ where $P_0 = 1$ atmosphere. At 0.1 P/P$_0$, the volumetric uptakes for Co-74, Ni-74, and Mg-74 are 59.76 mL CO$_2$/g MCP (2.67 mmole CO$_2$/g MCP), 58.91 mL CO$_2$/g MCP (2.63 mmole CO$_2$/g MCP), and 120.02 mL CO$_2$/g MCP (5.36 mmole CO$_2$/g MCP), respectively. This corresponds to 117.4 mg CO$_2$/g MCP (11.74 wt %), 115.7 mg CO$_2$/g MCP (11.57 wt %), and 235.8 mg CO$_2$/g MCP (23.58 wt %) for Co-74, Ni-74, and Mg-74, respectively. At 1.00 P/P$_0$, the volumetric uptakes for Co-74, Ni-74, and MG-74 are 156.15 mL CO$_2$/g MCP (6.97 mmole CO$_2$/g MCP), 128.34 mL CO$_2$/g MCP (5.73 mmole CO$_2$/g MCP), and 179.31 mL CO$_2$/g MCP (8.00 mmole CO$_2$/g MCP), respectively. This corresponds to 306.8 mg CO$_2$/g MCP (30.68 wt %), 252.2 mg CO$_2$/g MCP (25.22 wt %), and 352.3 mg CO$_2$/g MCP (35.23 wt %) for Co-74, Ni-74, and Mg-74, respectively.

Figure 8:
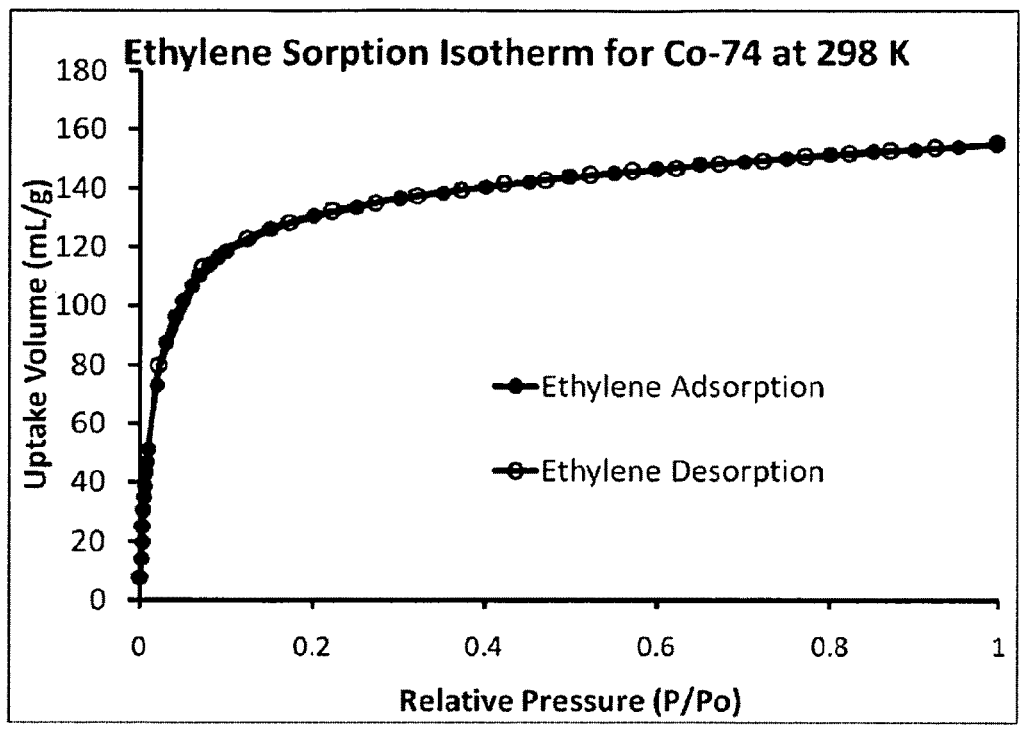
FIG. 8 provides an ethylene sorption isotherm for Co-74 measured at 298 K.
Figure 9:
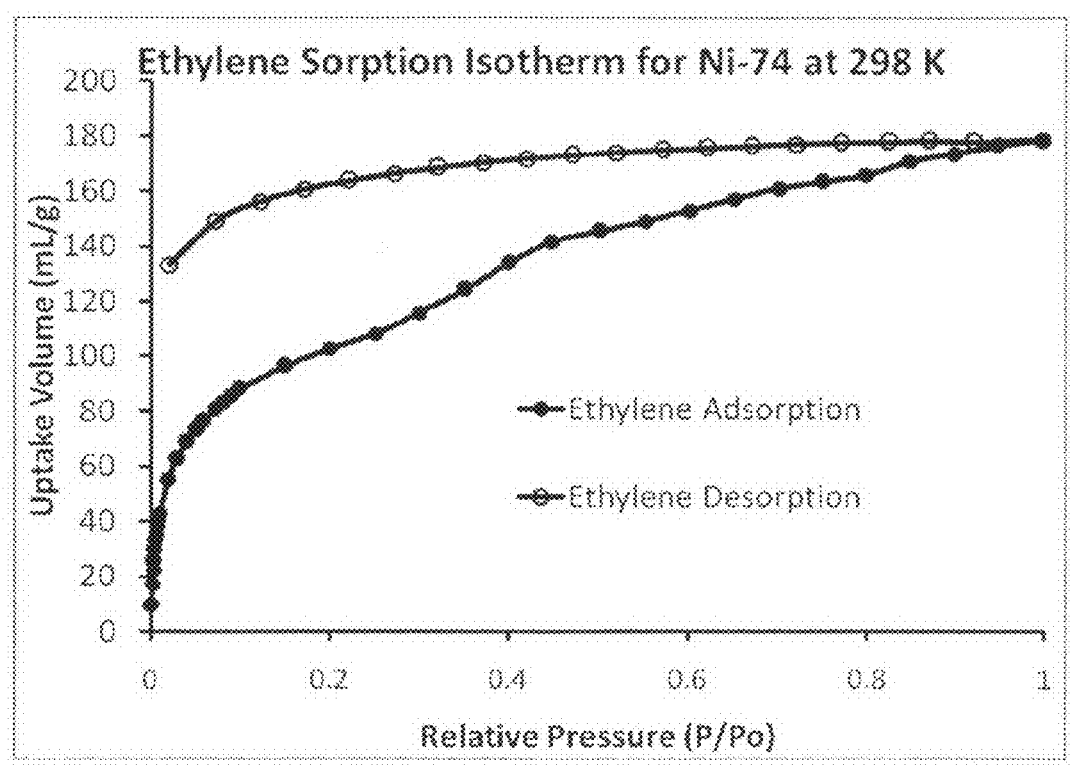
FIG. 9 provides an ethylene sorption isotherm for Ni-74 measured at 298 K.
Figure 10:
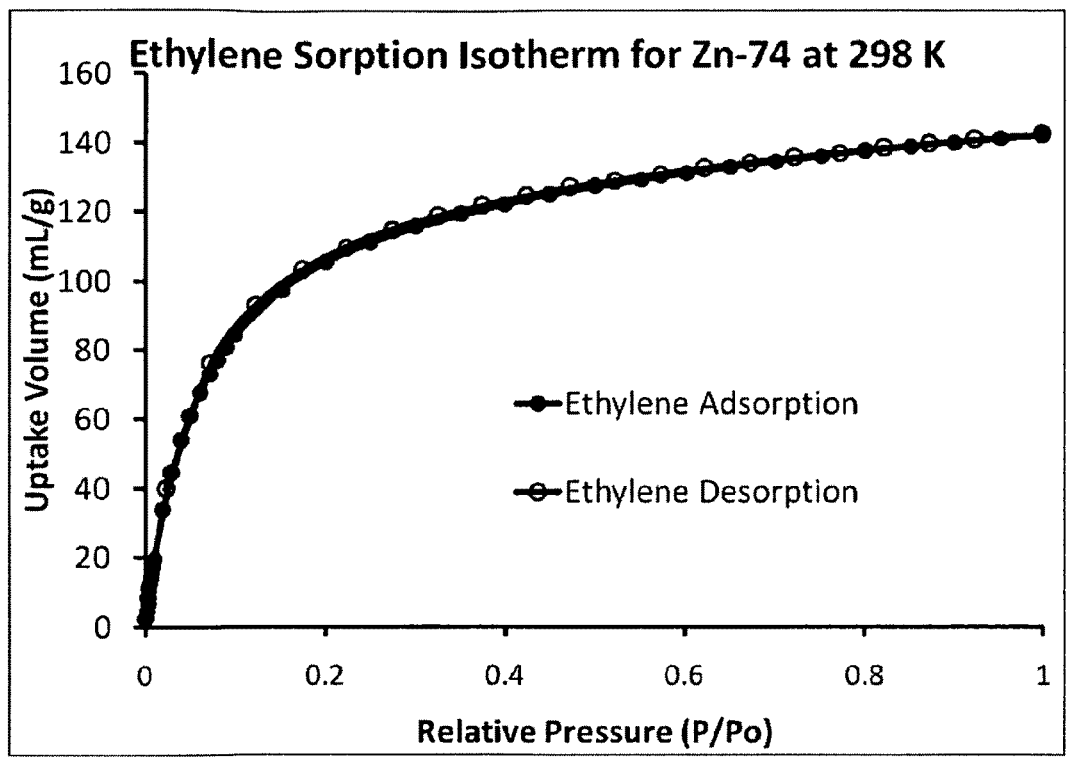
FIG. 10 provides an ethylene sorption isotherm for Zn-74 measured at 298 K.

With reference to FIGS. 8, 9, and 10, gas sorption isotherms were measured volumetrically using a Quantachrome Autosorb-1 automated adsorption analyzer. A temperature-regulated water bath (298 K) is used for ethylene isotherms. The ethylene gas used is chemically pure grade (99.5% purity) purchased from Airgas. For all isotherm plots, closed circles are used for adsorption data and open circles are used for desorption data points. Data is collected in the range from $1.00 \times 10^{-3} \leq P/P_0 \leq 1.00$ where $P_0 = 1$ atmosphere. At 0.10 P/P$_0$, the volumetric uptakes of ethylene for Co-74, Ni-74, and Zn-74 are 118.63 mL C$_2$H$_4$/g MCP (5.30 mmole C$_2$H$_4$/g MCP), 88.05 mL C$_2$H$_4$/g MCP (3.93 mmole C$_2$H$_4$/g MCP), and 84.69 mL C$_2$H$_4$/g MCP (3.78 mmole C$_2$H$_4$/g MCP), respectively. This corresponds to 148.7 mg C$_2$H$_4$/g MCP (14.87 wt %), 110.2 mg C$_2$H$_4$/g MCP (11.02 wt %), and 106.0 mg C$_2$H$_4$/g MCP (10.60 wt %) for Co-74, Ni-74, and Zn-74, respectively. At 1.00 P/P$_o$, the volumetric uptakes of ethylene for Co-74, Ni-74, and Zn-74 are 155.16 mL C$_2$H$_4$/g MCP (6.93 mmole C$_2$H$_4$/g MCP), 178.56 mL C$_2$H$_4$/g MCP (7.97 mmole C$_2$H$_4$/g MCP), and 142.43 mL C$_2$H$_4$/g MCP (6.36 mmole C$_2$H$_4$/g MCP), respectively. This corresponds to 194.4 mg C$_2$H$_4$/g MCP (19.44 wt %), 223.6 mg C$_2$H$_4$/g MCP (22.36 wt %), and 178.4 mg C$_2$H$_4$/g MCP (17.84 wt %) for Co-74, Ni-74, and Zn-74, respectively.

Figure 11:
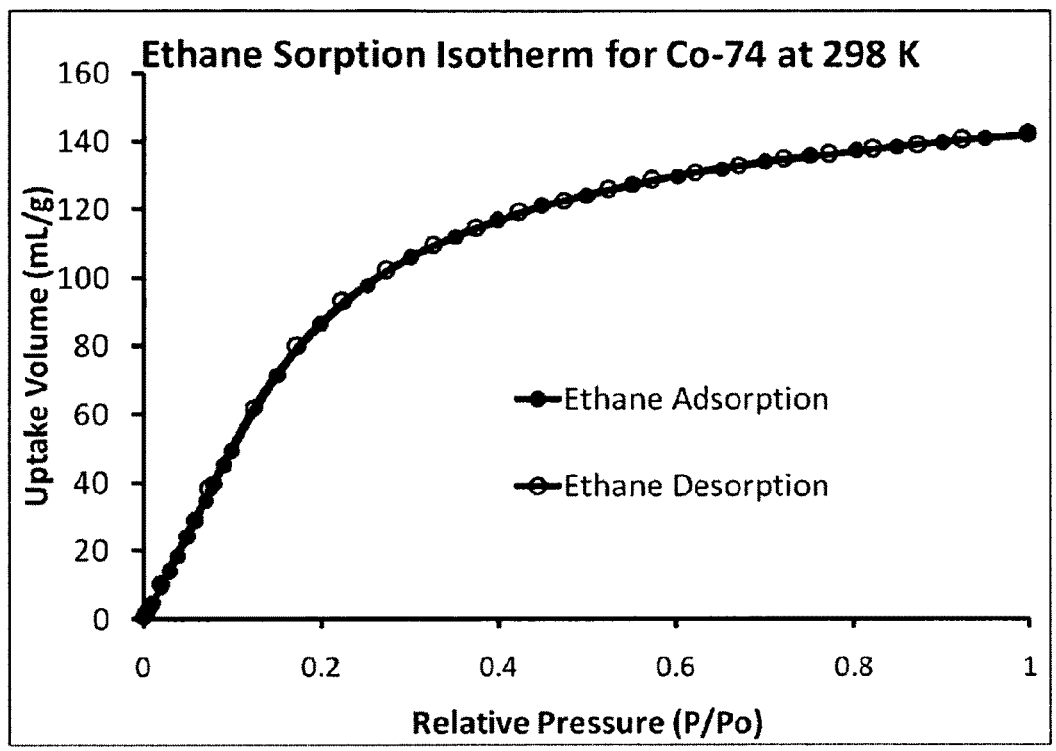
FIG. 11 provides an ethane sorption isotherm for Co-74 measured at 298 K.
Figure 12:
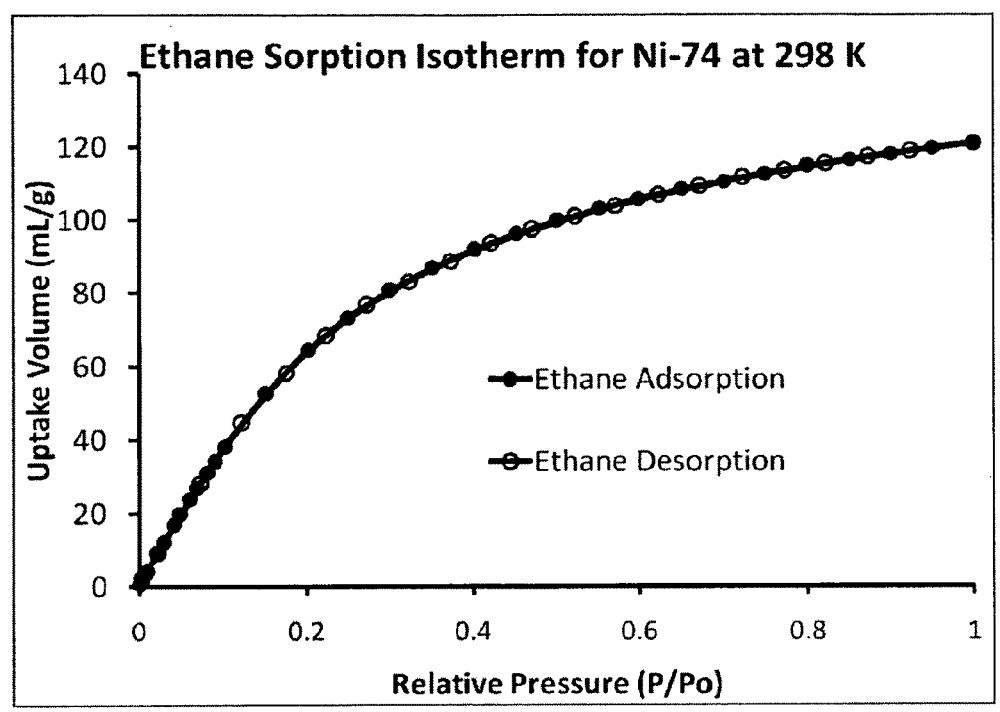
FIG. 12 provides an ethane sorption isotherm for Ni-74 measured at 298 K.
Figure 13:
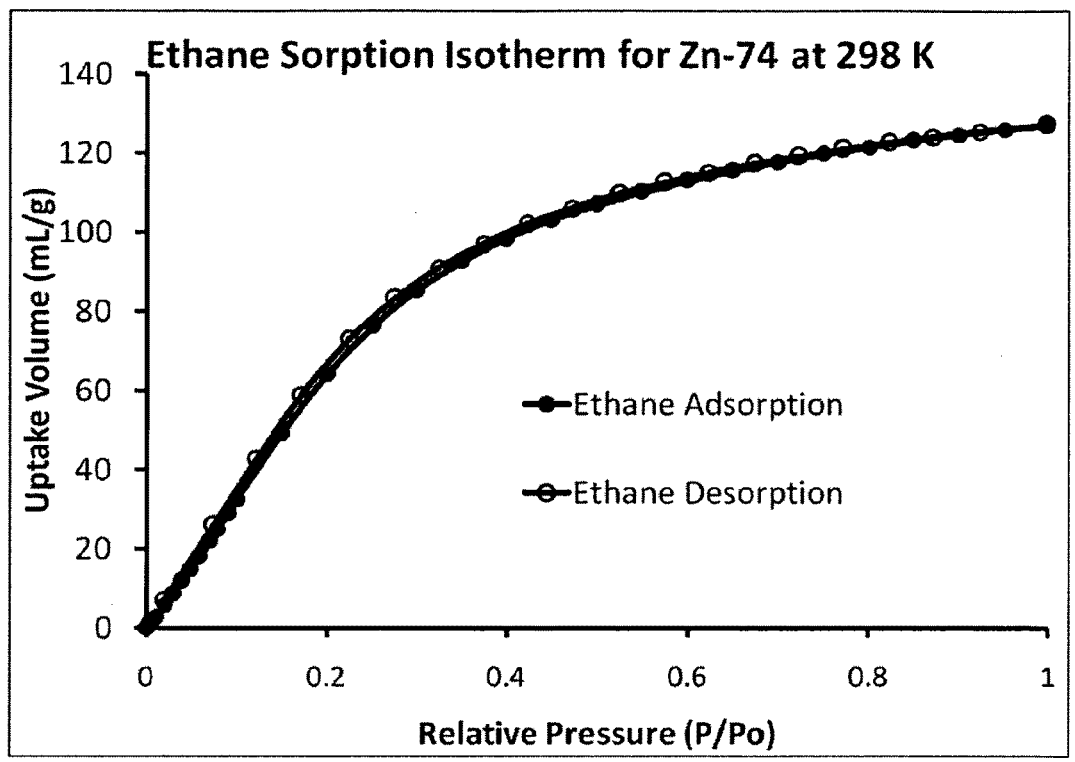
FIG. 13 provides an ethane sorption isotherm for Zn-74 measured at 298 K.

With reference to FIGS. 11, 12, and 13, gas sorption isotherms were measured volumetrically using a Quantachrome Autosorb-1 automated adsorption analyzer. A temperature-regulated water bath (298 K) is used for ethane isotherms. The ethane gas used is chemically pure grade (99.0% purity) purchased from Airgas. For all isotherm plots, closed circles are used for adsorption data and open circles are used for desorption data points. Data is collected in the range from $1.00 \times 10^{-3} \leq P/P_0 \leq 1.00$ where $P_0 = 1$ atmosphere. At 0.10 P/P$_0$, the volumetric uptakes of ethane for Co-74, Ni-74, and Zn-74 are 49.09 mL C$_2$H$_6$/g MCP (2.19 mmole C$_2$H$_6$/g MCP), 37.99 mL C$_2$H$_6$/g MCP (1.70 mmole C$_2$H$_6$/g MCP), and 32.48 mL C$_2$H$_6$/g MCP (1.45 mmole C$_2$H$_6$/g MCP), respectively. This corresponds to 65.8 mg C$_2$H$_6$/g MCP (6.58 wt %), 51.1 mg C$_2$H$_6$/g MCP (5.11 wt %), and 43.6 mg C$_2$H$_6$/g MCP (4.36 wt %) for Co-74, Ni-74, and Zn-74, respectively. At 1.00 P/P$_0$, the volumetric uptakes of ethane for Co-74, Ni-74, and Zn-74 are 142.19 mL C$_2$H$_6$/g MCP (6.35 mmole C$_2$H$_6$/g MCP), 121.05 mL C$_2$H$_6$/g MCP (5.40 mmole C$_2$H$_6$/g MCP), and 127.31 mL C$_2$H$_6$/g MCP (5.68 mmole C$_2$H$_6$/g MCP), respectively. This corresponds to 190.9 mg C$_2$H$_6$/g MCP (19.09 wt %), 162.4 mg C$_2$H$_6$/g MCP (16.24 wt %), and 170.8 mg C$_2$H$_6$/g MCP (17.08 wt %) for Co-74, Ni-74, and Zn-74, respectively.

V. Gas Chromatographic Separation Experiments

With reference to FIGS. 14-20, gas chromatographic separations were carried out with a Shimadzu GC-14a equipped with a thermal conductivity detector (TCD). A Restek Silcosteel column was packed with a 50:50 by weight mixture of Ni-74 and celite (Fisher). The length of the column is one foot (~30.5 cm) and the inner diameter is 0.055 mm. The carrier gas is helium. The TCD is maintained at a temperature of 200° C. and a bridge current of 100 mV is used for detection. Unactivated Ni-74 is packed in the column and the column is activated in situ by flow of helium with an accompanying column temperature of 250° C. for approximately 12 hours. The ethylene gas used is chemically pure grade (99.5% purity) purchased from Airgas. The ethane gas used is chemically pure grade (99.0% purity) purchased from Airgas. The propylene gas used is chemically pure grade (99.0% purity) purchased from Linde Gas. The propane gas used is 99.97% purity purchased from Aldrich.

With reference to FIG. 14, a 1:1 (v/v) mixture of ethane: ethylene (60 μL) was injected into the Shimadzu GC-14a containing a Ni-74/celite column. The inlet pressure of the helium was 500 kPa. The column temperature was 100° C. and the injector temperature was 100° C. A gas chromatogram of the isothermal separation of ethane and ethylene is provided in FIG. 14. Ethane elutes first at 2.7 minutes while ethylene elutes at 12.6 minutes.

With reference to FIG. 15, a 1:1 (v/v) mixture of ethane: ethylene (60 μL) was injected into the Shimadzu GC-14a containing a Ni-74/celite column. The inlet pressure of the helium was 360 kPa. The initial column temperature was 50° C. and the injector temperature was 100° C. A programmed temperature rate of 5° C./min was initiated upon injection. The final temperature was 175° C. A gas chromatogram of the temperature ramp separation of ethane and ethylene is provided in FIG. 15. Ethane elutes first at 5.9 minutes while ethylene elutes at 15.3 minutes.

With reference to FIG. 16, a 1:1 (v/v) mixture of ethane: ethylene (60 μL) was injected into the Shimadzu GC-14a containing a Ni-74/celite column. The inlet pressure of the helium was 360 kPa The initial column temperature was 50° C. and the injector temperature was 100° C. A programmed temperature rate of 10° C./min was initiated upon injection. The final temperature was 200° C. A gas chromatogram of the temperature ramp separation of ethane and ethylene is provided in FIG. 16. Ethane elutes first at 4.8 minutes while ethylene elutes at 9.9 minutes.

Figure 17:
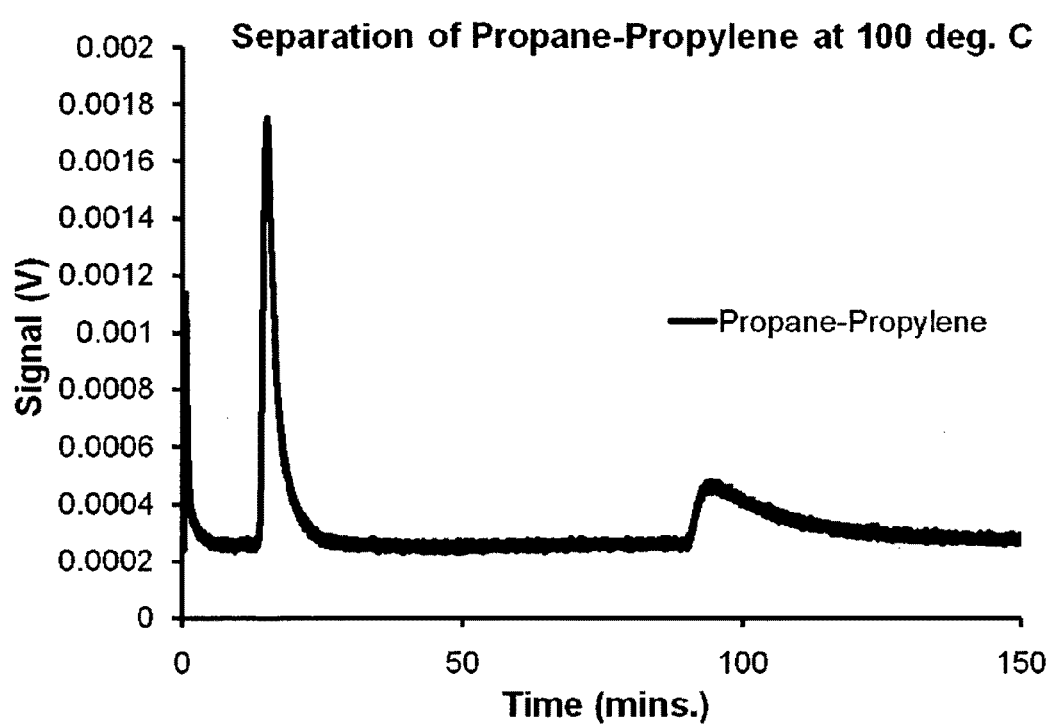
FIG. 17 provides a gas chromatogram of the separation of propane and propylene at 100° C. over a 50:50 wt. mixture of celite and Ni-74. Propane elutes first at 14.9 minutes while propylene elutes at 93.9 minutes.

With reference to FIG. 17, a 1:1 (v/v) mixture of propane:propylene (60 μL) was injected into the Shimadzu GC-14a containing a Ni-74/celite column. The inlet pressure of the helium was 405 kPa. The column temperature was 100° C. and the injector temperature was 100° C. A gas chromatogram of the isothermal separation of propane and propylene is provided in FIG. 17. Propane elutes first at 14.9 minutes while propylene elutes at 93.9 minutes.

Figure 18:
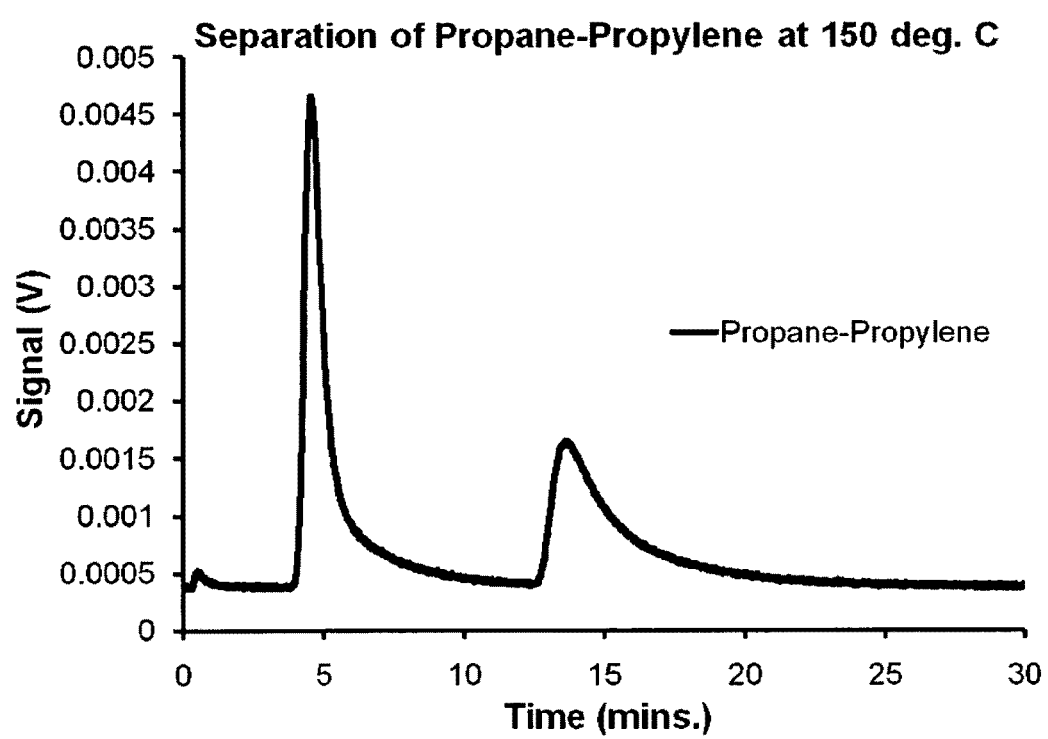
FIG. 18 provides a gas chromatogram of the separation of propane and propylene at 150° C. over a 50:50 wt. mixture of celite and Ni-74. Propane elutes first at 4.5 minutes while propylene elutes at 13.7 minutes.

With reference to FIG. 18, a 1:1 (v/v) mixture of propane:propylene (60 was injected into the Shimadzu GC-14a containing a Ni-74/celite column. The inlet pressure of the helium was 500 kPa. The column temperature was 150° C. and the injector temperature was 150° C. A gas chromatogram of the isothermal separation of propane and propylene is provided in FIG. 18. Propane elutes first at 4.5 minutes while propylene elutes at 13.7 minutes.

Figure 19:
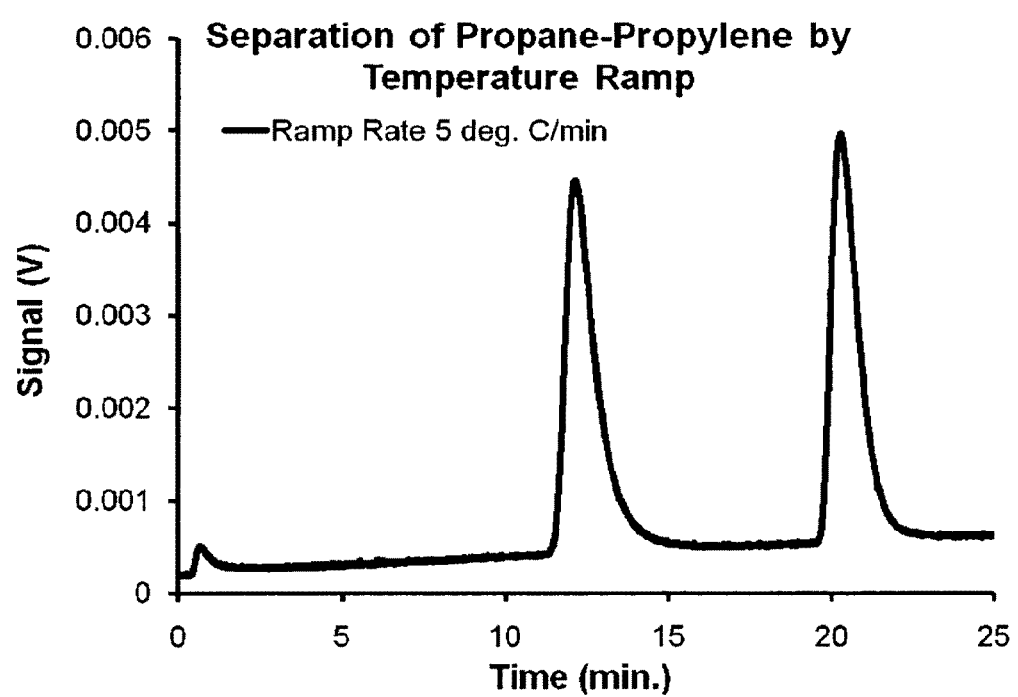
FIG. 19 provides a gas chromatogram of the separation of propane and propylene by a temperature ramp program from 75° C. to 200° C. at a rate of 5° C./min over a 50:50 wt. mixture of celite and Ni-74. Propane elutes first at 12.2 minutes while propylene elutes at 20.25 minutes.

With reference to FIG. 19, a 1:1 (v/v) mixture of propane:propylene (60 μL) was injected into the Shimadzu GC-14a containing a Ni-74/celite column. The inlet pressure of the helium was 380 kPa. The initial column temperature was 75° C. and the injector temperature was 150° C. A programmed temperature rate of 5° C./min was initiated upon injection. The final temperature was 200° C. A gas chromatogram of the temperature ramp separation of propane and propylene is provided in FIG. 19. Propane elutes first at 12.2 minutes while propylene elutes at 20.25 minutes.

Figure 20:
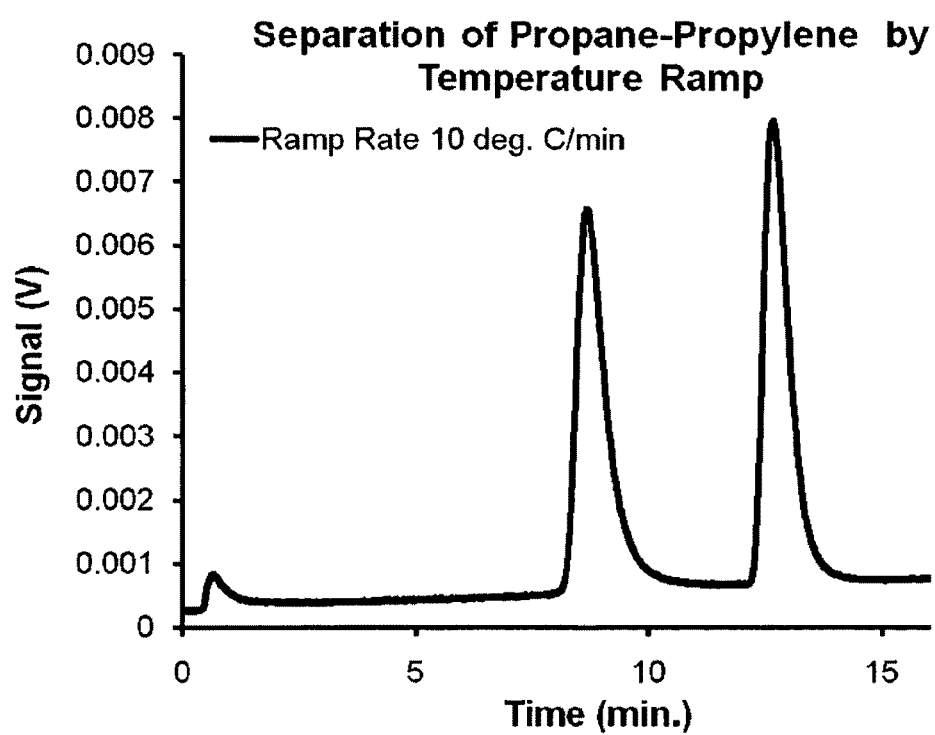
FIG. 20 provides a gas chromatogram of the separation of propane and propylene by a temperature ramp program from 75° C. to 250° C. at a rate of 10° C./min over a 50:50 wt. mixture of celite and Ni-74. Propane elutes first at 8.7 minutes while propylene elutes at 12.7 minutes.

With reference to FIG. 20, a 1:1 (v/v) mixture of propane:propylene (60 μL) was injected into the Shimadzu GC-14a containing a Ni-74/celite column. The inlet pressure of the helium was 380 kPa. The initial column temperature was 75° C. and the injector temperature was 150° C. A programmed temperature rate of 10° C./min was initiated upon injection. The final temperature was 250° C. A gas chromatogram of the temperature ramp separation of propane and propylene is provided in FIG. 20. Propane elutes first at 8.7 minutes while propylene elutes at 12.7 minutes.

While embodiments of the invention have been illustrated and described, it is not intended that these embodiments illustrate and describe all possible forms of the invention. Rather, the words used in the specification are words for description rather than limitation, and it is understood that various changes may be made without departing from the spirit and scope of the invention.

What is claimed is:

1. A method of separating a target component from a chemical mixture, the method comprising:
    contacting the chemical mixture with a microporous coordination polymer such that at least a portion of the target component is adsorbed to the microporous coordination polymer, the microporous coordination polymer comprising monomer units having formula:

$[M_2(C_8H_2O_6)]$ wherein M is a transition metal, rare earth metal, or other element from the groups consisting of IIA through VB, and
    wherein the target component is carbon dioxide or an olefin.

2. The method of claim 1 wherein M is $Co^{2+}$, $Ni^{2+}$, $Mg^{2+}$, or $Zn^{2+}$.

3. The method of claim 2, wherein M is $Co^{2+}$, $Ni^{2+}$, or $Mg^{2+}$.

4. The method of claim 1 wherein M is $Co^{2+}$.

5. The method of claim 1 wherein M is $Ni^{2+}$.

6. The method of claim 1 wherein M is $Mg^{2+}$.

7. The method of claim 1 wherein the microporous coordination polymer is activated by immersion in a low boiling solvent followed by evacuation under vacuum at elevated temperature from about 0° C. to about 325° C.

8. The method of claim 1 wherein the microporous coordination polymer is activated by immersion in a low boiling solvent followed by passing an inert gas through the microporous coordination polymer at temperatures between about 0° C. to about 325° C.

9. The method of claim 1 wherein the target component is carbon dioxide.

10. The method of claim 2 wherein the target component is $CO_2$.

11. The method of claim 9 wherein $CO_2$ uptake at 1 bar and 296 K is from about 20 to about 45 wt %.

12. The method of claim 9 wherein the uptake of $CO_2$ at 0.1 bar and 296 K is from about 5 to about 30 wt %.

13. The method of claim 10, wherein M is $Co^{2+}$, $Ni^{2+}$, or $Mg^{2+}$.

14. The method of claim 9 wherein the microporous coordination material is used in a fixed or moving bed adsorption systems for $CO_2$ separation, purification, or sequestration.

15. The method of claim 9 wherein the microporous coordination polymer is used as an adsorbent in pressure- or thermal-swing adsorption systems for $CO_2$ separation or sequestration.

16. The method of claim 9 wherein the microporous coordination material is used as an adsorbent for storage of $CO_2$.

17. The method of claim 1 wherein the target component is an olefin to be removed from a mixture containing a paraffin or paraffins.

18. The method of claim 17 wherein ethylene is separated from ethane.

19. The method of claim 17 wherein propylene is separated from propane.

20. The method of claim 17 wherein the microporous coordination polymer is used as an adsorbent in fixed or moving bed adsorption systems for separation of ethylene/ethane or for separation of propylene/propane.

21. The method of claim 17 wherein M is $Co^{2+}$, $Ni^{2+}$, $Mg^{2+}$, or $Zn^{2+}$.

22. The method of claim 21 wherein M is $Co^{2+}$, $Ni^{2+}$, or $Zn^{2+}$.

23. A method of separating a target component from a chemical mixture, the method comprising:
    contacting the chemical mixture with a microporous coordination polymer formed by reacting $Co^{2+}$, $Ni^{2+}$, $Mg^{2+}$, or $Zn^{2+}$ with a dicarboxylic acid linker selected from Formula (III) and Formula (IV)

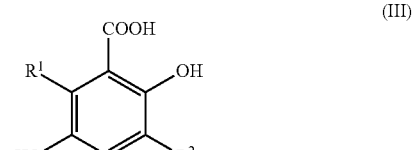

(III)

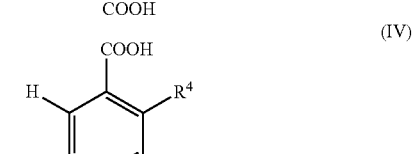

(IV)

such that at least a portion of the target component is adsorbed to the microporous coordination polymer, wherein $R^1$ and $R^2$ are independently selected from H, alkyl, aryl, halogen, hydroxyl, alkoxide, carboxyl, ester, sulfur-containing group, silicon-containing group, nitro, amino, cyano, boron-containing group, and phosphorus containing group, and wherein $R^3$ and $R^4$ are independently selected from thiol, primary amine, secondary amine, phosphorus-containing group, and boron-containing group.

24. A method according to claim 23, wherein the target compound is carbon dioxide or an olefin.

* * * * *

UNITED STATES PATENT AND TRADEMARK OFFICE
CERTIFICATE OF CORRECTION

PATENT NO. : 8,425,659 B2 Page 1 of 1
APPLICATION NO. : 12/744709
DATED : April 23, 2013
INVENTOR(S) : Matzger et al.

It is certified that error appears in the above-identified patent and that said Letters Patent is hereby corrected as shown below:

In the Specification

Column 9, line 61, delete "$Ti^2$," and insert --$Ti^{2+}$,--.

Column 11, line 5, delete "stint" and insert --scint--.

Column 11, line 60, delete "$P/P_0$," and insert --$P/P_0$,--.

Column 13, line 13, delete "( 60" and insert --(60 µL)--.

Signed and Sealed this
Twenty-fourth Day of September, 2013

Teresa Stanek Rea
*Deputy Director of the United States Patent and Trademark Office*